Patented Aug. 18, 1936

2,051,766

UNITED STATES PATENT OFFICE 2,051,766

METHOD OF MAKING PHENOL-TYPE RESINS

Mortimer T. Harvey, East Orange, N. J., assignor to The Harvel Corporation, a corporation of New Jersey No Drawing. Application May 1, 1935, Serial No. 19,330

4 Claims. (Cl. 260—3)

The present invention relates to reaction products of the phenol-formaldehyde type in which certain secondary and tertiary ethers of phenols are condensed with an aldehyde and the invention also relates to reaction products of the phenol-formaldehyde type in which mixture of phenols and ethers of phenols are condensed with an aldehyde. The present invention further relates to methods and steps of making and using the products of the present invention.

This application is a continuation in part of my copending applications Serial Number 716,333, filed March 19, 1934 and Serial Number 722,145, filed April 24, 1935.

Heretofore aromatic ethers of aliphatic compounds in which the alkyl radicle has more than three carbon atoms have been considered as being unreactive with formaldehyde or other aldehydes or reactive with such great difficulty and expense as to be impractical. I have discovered that aromatic ethers of aliphatic compounds in which the alkyl radicle has more than three carbon atoms can be easily condensed with formaldehyde or other aldehydes if the aliphatic radical is connected to the ether oxygen atom by an inner carbon, that is, if the alkyl radicle is in secondary or tertiary relation in the ether structure.

I find further than the condensation products of the present invention, and including the hard resinous state thereof, dissolve or are soluble in oils such as linseed oil and China-wood oil, for illustrative examples, and resins such, for example, as rosin, ester gums and fossil gums. I find also that the condensation product of the present invention, and including the hard resinous state thereof, dissolve phenolic resins such as cresol-formaldehyde and phenol-formaldehyde resins and take them into solution in drying oils, gums, and natural and other artificial resins and into paint, varnish and lacquer solvents. The products of the present invention are suitable for general use in the resin and resinous fields, and for making molded products, impregnations, electrical insulation, friction elements of all kinds such for example as brake blocks, brake bands and clutch facings, paints, varnishes, lacquers, baking enamels, and coatings for metal, paper and so on.

The higher order alkyl ethers of aromatic compounds used in the practice of the present invention can be made by replacing the hydrogen of the hydroxyl group of a phenol with a corresponding aliphatic radicle as by reaction with a secondary or tertiary alkyl alcohol or a secondary or tertiary alkyl halide or by reacting a phenol with a hydrocarbon having an unsaturated aliphatic linkage such as an ethylene linkage including aliphatic groups in which a carbon is connected to three other carbon atoms to one of which the connection is by a double bond.

As illustrative examples of starting phenols used for making ethers and substituted phenols the following are given to show the types of phenolic radicles and to determine illustratively the final products, the following are given: carbolic acid, naphthol, cresylic acid, ortho cresol, meta cresol, para cresol, meta para cresol, and other phenols, the xylenols, for example, 4-hydroxy-1.3-dimethylbenzene, phenyl phenol, as well as other homologues of these. However, the substituted phenols and the ethers produced from the starting phenols should have at least one reactive position unoccupied on the aromatic nucleus, that is, one of the ortho positions or the para position should be unoccupied in the ether or substituted phenol used for condensation with an aldehyde to produce the ether-aldehyde or mixed ether-aldehyde-phenol-aldehyde condensation products of the invention. With these qualifications, any substituted phenol or any ether will serve the purpose and the side branch or side branches on the aromatic nucleus of the ether or substituted phenol can be aromatic, alkyl, aralkyl, or combinations of these. It is to be understood however that the ethers used are those in which the hydrocarbon radicle connected to the characteristic ether oxygen atom is a secondary or tertiary radicle with respect to said oxygen atom and has more than three carbon atoms.

Also to illustrate compounds which can be used to make the ethers and the substituted phenols used in the practice of the present invention and to aid in defining said ethers and substituted phenols, the following examples of secondary and tertiary compounds of alkyl radicles having more than three carbon atoms: tertiary butyl chloride, tertiary butyl alcohol, methyl ethyl carbinol, diethyl carbinols, the two methyl propyl carbinols, methyl ethyl chlor methane, diethyl chlor methane, the two methyl propyl chlor methanes, secondary butyl alcohol, the secondary butyl chlorides, also the corresponding secondary and tertiary amines, and so on through the various homologous secondary and tertiary alcohols and chlorides. These secondary and tertiary compounds can have aryl radicles as well as alkyl.

An example of a compound having both an unsaturated bond and a secondary or tertiary linkage suitable for making ethers is terpineol, the principal constituent of pine oil. Either terpineol or pine oil can be used to make ethers or substituted phenols suitable for use in the practice of the present invention.

Examples of unsaturated hydrocarbons suitable for making the ethers and substituted phenols used in the practice of the present invention are propylene, butylene, amylene, hexylene and other homologous hydrocarbons, including all the normal and isometric forms thereof such as isobutylene, the iso-amylenes and so on. These may be taken separately or in any mixtures thereof, for example, the unsaturated compounds found in illuminating gas are suitable. Also the unsaturated hydrocarbons formed or resulting from the production of gasoline or any process for the cracking of mineral oils can be used. Many such unsaturated compounds are formed in great quantities in the processes used for cracking mineral oils to produce gasoline, kerosene and analogous hydrocarbons used for power or fuel. Some of these by-products are aliphatic and others are aromatic hydrocarbons, but most of them have ethylenic linkages.

Gas house oil drip and coke house distillate, particularly the materials thereof which distill in the range extending from about 120° C. to about 225° C., contain hydrocarbons, having ethylenic linkages, which are suitable for the practice of the present invention.

Further examples of materials having unsaturated groups in the form of ethylenic linkage in hydrocarbons and suitable in the practice of the present invention are styrene, indene, (both found in gas house drip), pine oil, unsaturated hydroaromatic hydrocarbons such as the terpenes (for example pinene and limonene), dihydronaphthalene, dihydrobenzene, and tetrahydrobenzene.

Other unsaturated compounds suitable for making the secondary and tertiary ethers and substituted phenols of the present invention are fatty acids having ethylene linkages such, for example, as oleic acid, linoleic acid, linolic acid, linolenic acid, ricinoleic acid, and the unsaturated fatty acids derived from linseed oil, China-wood oil, palm oil, castor oil and so on. And these acids can be used in the free acid form or in the glyceride form to make the ethers and substituted phenols of the present invention and the oils themselves in which these are found or from which they are derived can be used to make said ethers and substituted phenols. The aldehyde reaction products of these said ethers and substituted phenols are oil soluble and can be brought to a hard resinous soluble, fusible state.

Examples of aldehydes and aldehyde producing materials suitable for use in the practice of the present invention are formaldehyde, acetaldehyde, furfuraldehyde, benzaldehyde, paraformaldehyde, hexamethylenetetramine and equivalents of these materials.

The methods of making the ethers and the substituted phenols used in the practice of the present invention are disclosed in my above identified copending applications.

The following are given as examples of the methods and products of the present invention.

*Example 1.*—A commercial cresol fraction comprising substantially thirty parts by weight of phenol, fifty parts of ortho cresol and twenty parts of metal para cresol is reacted with about the molecular proportion of tertiary butyl alcohol at about 15 to 20° C. with the addition of concentrated sulphuric acid which was added drop by drop with agitation until a milky appearance was observed and which indicated the separation of a dilute solution of the sulphuric acid in the water formed by the reaction. The reaction products were left to stand to separate them from the sulphuric acid solution which was taken off after which the reaction products were washed several times with water. The product is a mixture comprising principally tertiary butyl ethers and tertiary butyl phenols.

Then formaldehyde in the form of about a 38% solution in water was added in amount about a molecular proportion calculated on amount of phenol, ortho cresol and meta para cresol in the said commercial fraction. To this mixture was added a 28% solution of ammonia in amount about nine (9%) per cent of the volume of formaldehyde solution added. The mixture was heated under a reflux condenser about six hours at boiling temperature after which the aqueous solution was separated from the resinous material which was further heated at about 105° C. until the desired body was reached.

*Example 2.*—A commercial grade of cresylic acid, for example one containing about 90% of 1—4—2 xylenol (3.6 dimethyl phenol), was reacted with about a molecular proportion of tertiary butyl alcohol with the aid of concentrated sulphuric acid in the manner and at the temperature set forth above in Example 1. The other steps following were observed including the reacting of the ether and substituted phenol mixture with formaldehyde and ammonia to get a resinous body or a resin of the desired consistency.

In both Examples 1 and 2 a hard, brittle resin can be made which is fusible and is soluble in linseed oil, China-wood oil and so on.

*Example 3.*—A commercial grade of phenol comprising about 91% phenol (carbolic acid), seven per cent ortho-cresol and two per cent meta-para cresol were treated by steps similar to those in Examples 1 and 2 to get a frangible button of resin which was oil soluble and fusible.

*Example 4.*—A mixture of about forty parts by weight of cresylic acid and twenty-five parts of amylene was cooled to about 25° C. and about forty parts by weight of concentrated sulphuric acid added slowly, the mixture being well stirred and the temperature being maintained below 30° C. During the addition of the sulphuric acid, reaction took place between the cresylic acid and the amylene to form a mixture of aromatic amyl ethers corresponding to the phenolic compounds present in the cresylic acid used, the amyl radicle being connected to the oxygen of the phenols at an inner carbon thereof. Substituted phenols were also formed and the mixed product is referred to as ether-phenol mixture.

The sulphuric acid was removed by gravimetric separation and the ether-phenol mixture washed with water.

Substantially equal parts by weight of the ether-phenol mixture obtained as described above and forty per cent formaldehyde are mixed together with ten per cent of their total weight of twenty-eight per cent ammonia and heated under a reflux condenser to obtain a condensation of the ether-phenol mixture and the formaldehyde. The final product of the condensation is resinous and frangible when cold, is clear and light colored, with the color stable to light and heat, and is soluble in linseed oil and China-wood oil and in mixtures thereof. An illustrative example of a suitable proportion is equal parts by weight of each of the resin, of linseed oil and of China-wood oil.

*Example 5.*—Substantially equal parts by weight of cresylic acid and a 150° to 200° C. fraction of gas house oil drip are stirred together while about the same weight of sulphuric acid is added slowly and the temperature maintained at below 30° C. After this addition, the mixture is left to stand for about two hours at normal temperature. When the reaction between the cresylic acid and the oil drip is complete, the resulting ether-phenol mixture is separated from the sulphuric acid, washed several times with one or two volumes of water, the ether-phenol and water mixture being left to stand in a container with a bottom drain for a number of hours (for example, twelve hours) after which the ether-phenol mixture is drawn off the bottom. It is noted that at the first mixing with water, the ether-phenol mixture floated on the water and at the second the ether-phenol mixture sinks to the bottom.

Substantially equal weights of this ether-phenol mixture and of forty per cent formaldehyde solution are mixed with about six per cent of their total in twenty-eight per cent ammonia and refluxed for from one to two hours to form the resin, which sinks in the water of the formaldehyde. The resin is separated and brought to the desired body. This resin is very light colored and has a good melting point and is soluble in linseed oil, in China-wood oil, and in mixtures thereof. An example of a suitable proportion is equal parts by weight each of the resin, of linseed oil and of China-wood oil.

The hydrocarbons used in this example are obtained in somewhat similar constitution from coke house distillates and are known as solvent naphtha.

*Example 6.*—Substantially equal parts by weight of cresylic acid and of styrene are stirred together and the temperature maintained at below 30° C. while an equal weight of concentrated sulphuric acid is added slowly. The resulting ether-phenol mixture is separated and washed.

About equal weights of the ether-phenol mixture and formaldehyde and ten per cent of the total of twenty-eight per cent ammonia when refluxed give a resin soluble in linseed oil, in China-wood oil and in mixtures thereof.

The above examples are given as illustrations of the practice of the present invention in making resinous materials and resins and as examples of the products obtained and can not be taken as limiting the invention. In these examples the materials reacted with the formaldehyde are mixtures of ethers and substituted phenols in which the ethers comprise at least 15% of the total ethers and phenols. The percentage of ethers and substituted phenols can be varied by varying the temperature which latter is kept below about 30° C. The lower the temperature the greater the amount of ethers results. Likewise the amount of substituted phenols is greater when greater amounts of sulphuric acid are used. By using optimum temperature and amount of sulphuric acid the ethers can be produced in amount up to nearly 100% of the total ethers and substituted phenols. Also when ethers alone are desired the phenolic materials can be separated by washing with caustic solution. However, for most purposes the mixtures of ethers and phenols can be used and the proportions can be controlled by the steps and in the manner above described to suit the conditions for which the final products are to be used. As above indicated, in most cases the ethers are present and are used in amount equal to at least 15% of the ether-phenol mixtures.

In the above examples ammonia has been given as an example of the catalyst used for the formaldehyde condensation reaction but caustic soda or other alkaline catalyst can be used. Also the condensation reaction can be carried on with the aid of an acid catalyst such for example as hydrochloric acid or sulphuric acid. The resinous materials and the resins are soluble in the drying oils, linseed oil and China-wood oil as examples, in both the case where an alkaline catalyst is used and where the acid catalyst is used.

Formaldehyde in the above examples has been used in substantially molecular proportions but it can be used in greater or less proportions to suit the use for which the final product is used.

Certain inventions decribed herein and not claimed herein are claimed in my copending applications Serial Numbers 46,166 and 46,167 both filed October 22, 1935.

Having thus described my invention, what I desire to protect by Letters Patent is:

1. The method of making an oil soluble resin of the phenol-formaldehyde type, with ammonia as a catalyst, which comprises incorporating a tertiary ether of a phenol as at least twenty per cent of the material reacted with the aldehyde.

2. The method of making an oil soluble resin which comprises reacting, with ammonia as a catalyst, an aldehyde with a mixture of a phenol and a tertiary ether of a phenol, in which mixture the said ether is at least fifteen per cent by weight of the total of ether and phenol.

3. The method of making oil soluble resins which comprises reacting an aldehyde with material selected from the group consisting of phenols and secondary and tertiary ethers of phenols, in which said ethers the secondary and tertiary radicles have more than three carbon atoms, which method is further characterized by the fact that said ethers comprise at least fifteen per cent of the material selected from said group and that ammonia is used as a catalyst.

4. The method of making oil soluble alkali insoluble resins which comprises reacting, with ammonia as a catalyst, an aldehyde with material selected from the group consisting of phenols and secondary and tertiary butyl and amyl ethers of phenols, in which method said ethers comprise at least fifteen per cent of the material selected from said group.

MORTIMER T. HARVEY.